US012809685B2

(12) United States Patent
Kim et al.

(10) Patent No.: US 12,809,685 B2
(45) Date of Patent: Nov. 24, 2026

(54) ON CHIP MULTI-CORE SYSTEM AND OPTIMIZING METHOD FOR PARTIAL REGION RESOURCE SELECTION

(71) Applicants: SK hynix Inc., Icheon (KR); EWHA UNIVERSITY-INDUSTRY COLLABORATION FOUNDATION, Seoul (KR)

(72) Inventors: Ji Hoon Kim, Seoul (KR); So Hyeon Kim, Seoul (KR)

(73) Assignees: SK hynix Inc., Icheon (KR); EWHA UNIVERSITY-INDUSTRY COLLABORATION FOUNDATION, Seoul (KR)

( * ) Notice: Subject to any disclaimer, the term of this patent is extended or adjusted under 35 U.S.C. 154(b) by 619 days.

(21) Appl. No.: 18/452,215

(22) Filed: Aug. 18, 2023

(65) Prior Publication Data

US 2024/0281295 A1 Aug. 22, 2024

(30) Foreign Application Priority Data

Feb. 17, 2023 (KR) ........................ 10-2023-0021644

(51) Int. Cl.
*G06F 9/46* (2006.01)
*G06F 9/50* (2006.01)

(52) U.S. Cl.
CPC .................................. *G06F 9/5044* (2013.01)

(58) Field of Classification Search
None
See application file for complete search history.

(56) References Cited

U.S. PATENT DOCUMENTS 10,817,309 B2 10/2020 Raz
2003/0056091 A1* 3/2003 Greenberg .......... G06F 15/7867 713/100
2014/0281472 A1 9/2014 Yalamanchili
2022/0309028 A1* 9/2022 Nama ................. G06F 15/7885

FOREIGN PATENT DOCUMENTS

KR 1020190103379 A 9/2019

OTHER PUBLICATIONS

Tabero et al; A Low Fragmentation Heuristic for Task Placement in 2D RTR HW Management; J. Becker, M. Platzner, S. Vernalde (Eds.): FPL 2004, LNCS 3203, pp. 241-250, 2004 (Year: 2004).*

* cited by examiner

*Primary Examiner* — Bing Zhao

(57) ABSTRACT

Proposed are an on chip multi-core system and an optimizing method for PR resource selection in which management for allocating a plurality of partial regions (PRs) constituting a reconfigurable resource pool to a corresponding core of multiple cores and management for reconfiguring the inside of each PR can be separately performed, fragmentation can be minimized after the allocation of the PRs, and the reconfiguration time of an accelerator can be shortened. The on chip multi-core system includes a PR map, a core unit, a PR resource management processor, an inter PR routing controller, a bitstream memory, and an intra PR configuration controller.

9 Claims, 13 Drawing Sheets

| Number Of PR Requirement | topology |
| --- | --- |
| 1 |  |
| 2 |  |
| 3 |  |
| 4 |  |
| 5 |  |

ON CHIP MULTI-CORE SYSTEM AND OPTIMIZING METHOD FOR PARTIAL REGION RESOURCE SELECTION

CROSS-REFERENCE TO RELATED APPLICATION

This application claims priority under 35 U.S.C. § 119 to Korean Patent Application No. 10-2023-0021644 filed on Feb. 17, 2023, which is incorporated herein by reference in its entirety.

BACKGROUND

1. Field

Exemplary embodiments relate to a system on chip (SOC), and particularly, to an on chip multi-core system and an optimizing method for PR (partial region) resource selection in which management for allocating a plurality of partial regions (PRs) constituting a reconfigurable resource pool to a corresponding core of multiple cores and management for reconfiguring PRs can be separately performed, fragmentation of the PRs can be minimized after the allocation of the PRs, and a PR is selected so that a reconfiguration time of an accelerator can be shortened.

2. Discussion of the Related Art

A system on chip (SOC) includes a processor capable of executing program codes, and may include a plurality of cores, that is, a plurality of processors, to simultaneously perform a plurality of functions. An accelerator is a special purpose processing device effective for performing a specific function, and each core includes an accelerator suitable for performing a specific function required for each core. Such an accelerator is assumed to be a rigid accelerator since it is not correctable once implemented.

When a circuit constituting an accelerator is implemented with an embedded field programmable gate array (eFPGA), since it may be distinguished from the rigid accelerator, it may be referred to as a flexible accelerator. Assuming that one functional block implemented with an eFPGA is a PR, one PR includes a plurality of programmable configuration logic blocks (CLBs) and a plurality of switching blocks (SBOXs). The flexible accelerator includes at least one PR according to its function.

In a system on chip including multiple cores, at least one PR is allocated to configure a flexible accelerator according to a requested function of the flexible accelerator. After being used, the allocated PR is released from the accelerator and returned to a state before the allocation, and then can be reused to configure another flexible accelerator through a corresponding bitstream. When a bitstream is loaded onto a plurality of PRs for allocation in order to configure a specific flexible accelerator, a length of a signal transmission path needs to be minimized by grouping adjacent PRs and allocating the grouped PRs to configure the specific flexible accelerator.

When a region including a plurality of PRs in the system on a chip is referred to as a PR resource unit, adjacent PRs included in the PR resource unit are grouped and allocated as described above. As a result of repeatedly allocating and returning PRs, a fragmentation phenomenon may occur. When the fragmentation phenomenon occurs, there are no actually configurable adjacent PRs, that is, there are no reallocatable adjacent PRs, even though sufficient available PRs remain in the PR resource unit. When the number of resources in an under-utilization state is increased due to the fragmentation phenomenon, it is not possible to effectively utilize resources.

SUMMARY

Various embodiments are directed to providing an on chip multi-core system in which management for allocating a plurality of partial regions (PRs) constituting a reconfigurable resource pool to a corresponding core of multiple cores and management for reconfiguring PRs can be separately performed, fragmentation of the PRs can be minimized after the allocation of the PRs, and a configuration time of an accelerator can be shortened.

Various embodiments are directed to providing an optimizing method for PR resource selection in which management for allocating a plurality of PRs constituting a reconfigurable resource pool to a corresponding core of multiple cores and management for reconfiguring PRs can be separately performed, fragmentation of the PRs can be minimized after the allocation of the PRs, and a configuration time of an accelerator can be shortened.

Technical problems to be achieved in the present disclosure are not limited to the aforementioned technical problems and the other unmentioned technical problems will be clearly understood by those skilled in the art from the following description.

An on chip multi-core system in accordance with the present disclosure includes a PR map, a core unit, a PR resource management processor, an inter-PR routing controller, a bitstream memory, and an intra-PR configuration controller. In the PR map, a plurality of PRs including a plurality of PRs that are implemented with an eFPGA (embedded field programmable gate array). The core unit includes a plurality of cores. The PR resource management processor determines the number of PRs required to configure a flexible accelerator requested by a core, to select PRs satisfying at least one of a minimum fragmentation condition of the PR map and a minimum reconfiguration time, to generate a routing signal for allocating the PRs to the core, and to generate a PR reconfiguration signal for reconfiguring the PRs. The inter-PR routing controller connects the PRs to the core in response to the routing signal. The bitstream memory stores the bitstream including configuration information of the PRs. The intra-PR configuration controller configures the PRs according to the bitstream in response to the PR reconfiguration signal.

An optimizing method for PR resource selection in accordance with one aspect of the present disclosure may include: setting a plurality of topologies of PRs according to the number of PRs, applying each of the plurality of topologies corresponding to the number of PRs required to configure a flexible accelerator requested by a core to all applicable PR regions of a PR map, in which a plurality of PRs are disposed, among available PR regions of the PR map, and assigning a weight to an application of each topology by considering use efficiency of available PR regions of the PR map, and selecting a topology used for an application with a maximum weight and a location of PRs corresponding to the selected topology as an optimal topology and an optimum PR location, respectively.

An optimizing method for PR resource selection in accordance with another aspect of the present disclosure may include: setting a plurality of topologies of PRs according to the number of PRs; applying a topology having a reconfiguration time of a flexible accelerator that increases from a topology having a minimum reconfiguration time, among the plurality of topologies corresponding to the number of PRs required to configure the flexible accelerator requested by a core, to all applicable PR regions of a PR map, in which a plurality of PRs are disposed, among available PR regions of the PR map, and assigning a weight to each application of the topology by considering use efficiency of available PR regions of the PR map remaining after said each application is; and selecting a topology used for an application with a maximum weight and a location of PRs corresponding to the selected topology as an optimal topology and an optimum PR location, respectively.

Technical problems to be achieved in the present disclosure are not limited to the aforementioned technical problems and the other unmentioned technical problems will be clearly understood by those skilled in the art from the following description.

According to an on chip multi-core system and an optimizing method for PR resource selection in accordance with the present disclosure described above, management for allocating a plurality of PRs constituting a reconfigurable resource pool to a corresponding core of multiple cores and management for reconfiguring the inside of each PR can be separately performed, fragmentation can be minimized after the allocation of the PRs, and the reconfiguration time of an accelerator can be shortened.

Effects achievable in the disclosure are not limited to the aforementioned effects and the other unmentioned effects will be clearly understood by those skilled in the art from the following description.

DETAILED DESCRIPTION

Figure 1:
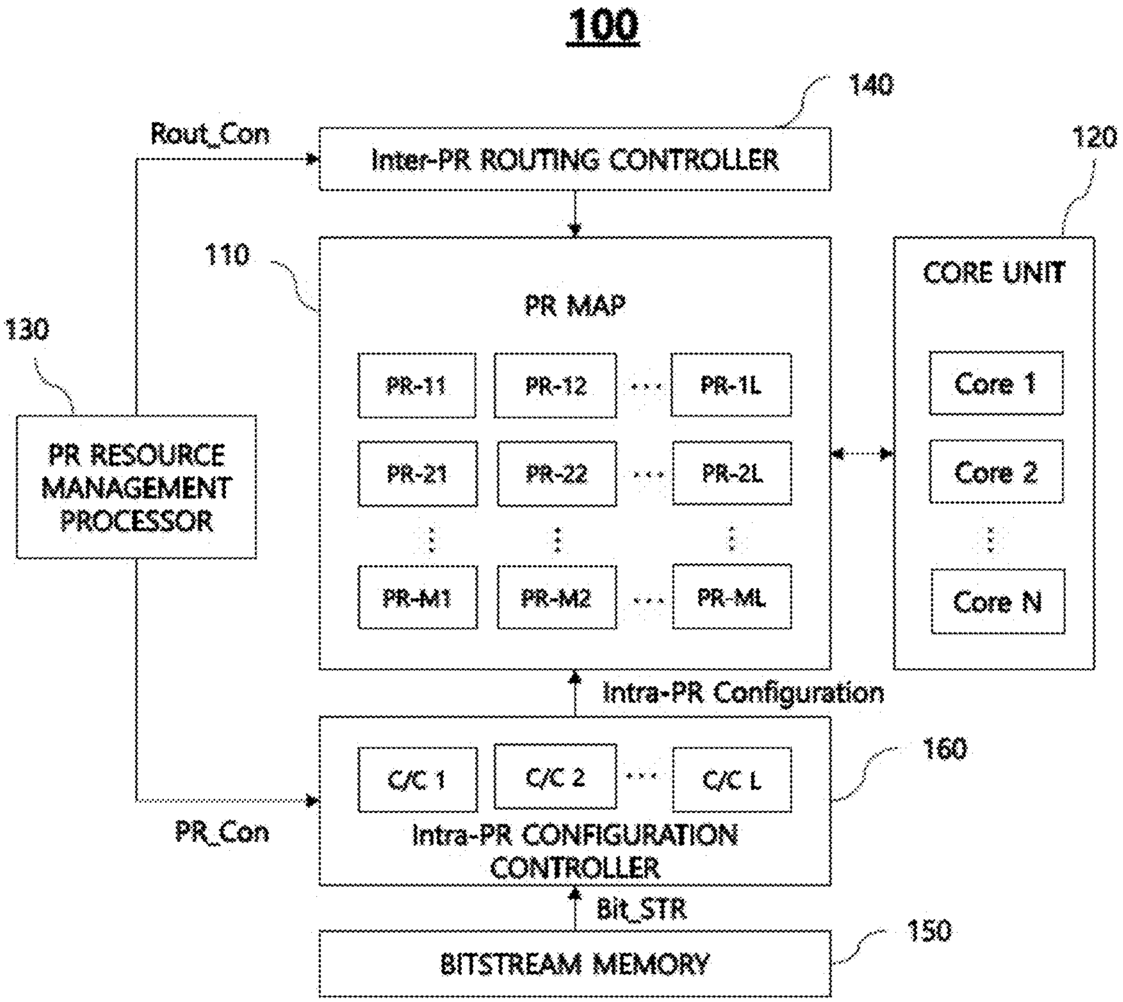
FIG. 1 illustrates an on chip multi-core system in accordance with an embodiment of the present disclosure.

In order to fully understand the present disclosure, advantages in operation of the present disclosure, and objects achieved by carrying out the present disclosure, the accompanying drawings for explaining exemplary examples of the present disclosure and the contents described with reference to the accompanying drawings need to be referred to.

Hereinafter, the present disclosure is described in detail by explaining preferred embodiments of the present disclosure with reference to the accompanying drawings. The same reference numerals in each drawing indicate the same members.

FIG. 1 illustrates an on chip multi-core system 100 in accordance with an embodiment of the present disclosure.

Referring to FIG. 1, the on-chip multi-core system 100 includes a PR map 110, a core unit 120, a PR resource management processor 130, an inter-PR routing controller 140, a bitstream memory 150, and an intra-PR configuration controller 160.

The PR map 110 includes a plurality of PRs PR-11 to PR-1L, PR-21 to PR-2L, . . . , and PR-M1 to PR-ML (M and L are natural numbers) implemented with an eFPGA that generates a logic circuit corresponding to a bitstream Bit_STR.

The core unit 120 includes a plurality of cores Core 1 to Core N (N is a natural number). A core may be a processor that is a signal processing device for performing a specific function.

The PR resource management processor 130 determines the number of PRs required for configuring a flexible accelerator requested by an arbitrary core, selects PRs satisfying at least one of a minimum fragmentation condition of the PR map 110 and a minimum condition of a flexible accelerator reconfiguration time, generates a routing signal Rout_Con including information for allocating the selected PRs to a corresponding core, and generates a PR reconfiguration signal PR_Con instructing reconfiguration of the PRs.

The inter-PR routing controller 140 connects the selected PRs to the corresponding core in response to the routing signal Rout_Con provided by the PR resource management processor 130.

The bitstream memory 150 stores a bitstream Bit_STR including configuration information of the PRs.

The intra-PR configuration controller 160 includes a plurality of intra-PR configuration controllers C/C 1 to C/C L, and configures the PRs according to PR configuration information Intra-PR Configuration included in the bitstream Bit_STR in response to the PR reconfiguration signal PR_Con provided by the PR resource management processor 130.

As illustrated in FIG. 1, since the management for allocating a plurality of partial-regions (PRs) constituting a reconfigurable resource pool to a corresponding core of multiple cores is performed by the inter-PR routing controller 140 and the management for reconfiguring PRs is performed by the intra-PR configuration controller 160, there is an advantage in that the inter-PR routing controller 140 and the intra-PR configuration controller 160 can be designed specialized for assigned functions.

In the related art, functions performed by the inter-PR routing controller 140 and the intra-PR configuration controller 160 are integrated and performed by a single signal processing device. However, the single signal processing device has a disadvantage in that implementation of the single signal processing device is complicated. Particularly, since the single signal processing device needs to be designed according to the degree of processing capability required by the functions of the inter-PR routing controller 140 and the intra-PR configuration controller 160, the design and use of the single signal processing device may be inefficient.

Figure 2:
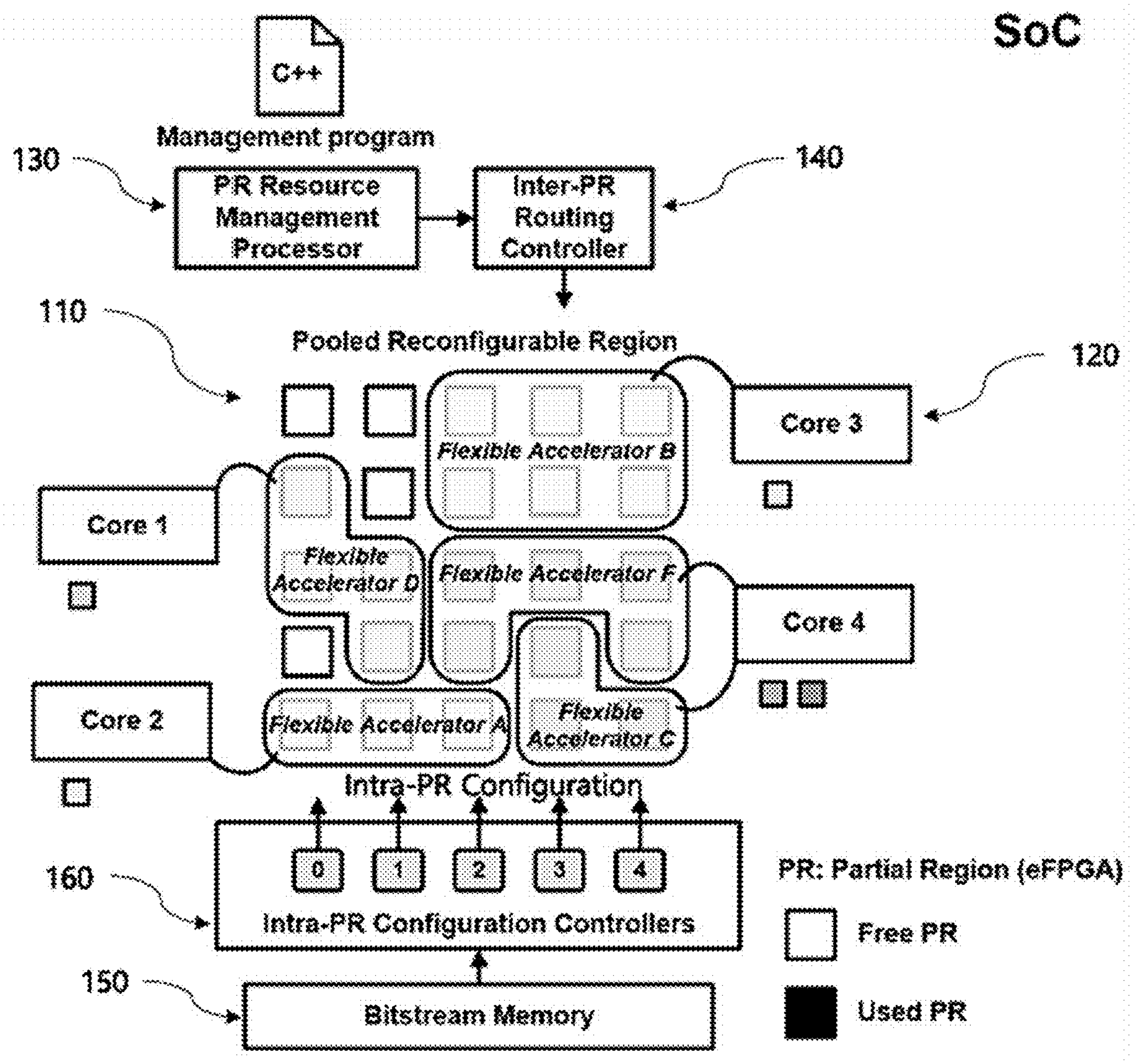
FIG. 2 illustrates an on chip multi-core system in accordance with an embodiment of the present disclosure.

FIG. 2 illustrates an on chip multi-core system in accordance with an embodiment of the present disclosure. The on chip multi-core system illustrated in FIG. 2 may correspond to the on chip multi-core system of FIG. 1, and may be implemented with a system on chip (SoC).

Referring to FIG. 2, the core unit 120 includes 4 cores Core 1 to Core 4, and the intra-PR configuration controller 160 includes five intra-PR configuration controllers 0 to 4.

The first core Core 1 utilizes a flexible accelerator D including four PRs, the second core Core 2 utilizes a flexible accelerator A including three PRs, the third core Core 3 utilizes a flexible accelerator B including six PRs, and the fourth core Core 4 utilizes a flexible accelerator F including five PRs and a flexible accelerator C including three PRs. Each core may utilize at least one flexible accelerator.

Figure 3:
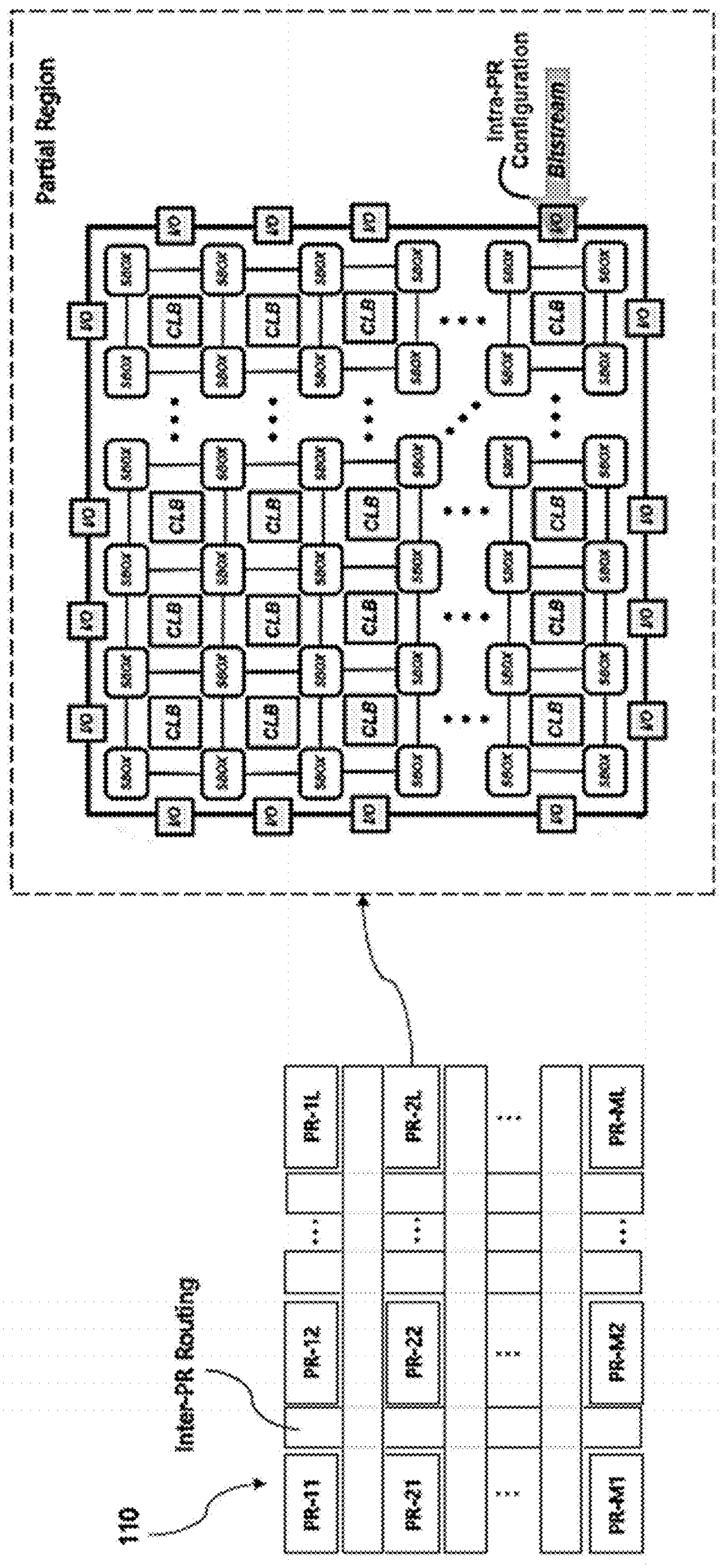
FIG. 3 illustrates a PR map in accordance with an embodiment of the present disclosure.

FIG. 3 illustrates a PR map in accordance with an embodiment of the present disclosure. The PR map illustrated in FIG. 3 may correspond to the PR map 110 of FIG. 1.

Referring to the left side of FIG. 3, it can be seen that an internal connection relationship Inter-PR Routing of the plurality of PRs PR-11 to PR-1L, PR-21 to PR-2L, . . . , and PR-M1 to PR-ML is determined according to the routing signal Rout_Con provided by the PR resource management processor 130.

The right side of FIG. 3 shows an example of an internal configuration of one PR, e.g., PR-2L, among the plurality of PRs PR-11 to PR-1L, PR-21 to PR-2L, . . . , and PR-M1 to PR-ML.

Referring to the right side of FIG. 3, the PR PR-2L includes a plurality of logic blocks CLB constituting a circuit corresponding to the configuration information Intra-PR Configuration included in the bitstream Bit_STR and a plurality of switching blocks SBOX for switching the plurality of logic blocks CLB according to the configuration information Intra-PR Configuration.

Figure 4:
FIG. 4 illustrates a representative topology according to the number of PRs required for a flexible accelerator in accordance with an embodiment of the present disclosure.
Figure 4:
Figure 4:
Figure 4:
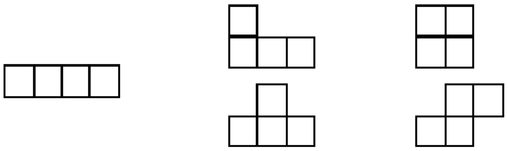
Figure 4:
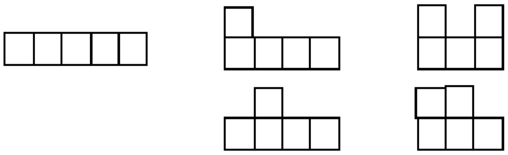

FIG. 4 illustrates a representative topology according to the number of PRs required for configuring a flexible accelerator proposed by the present disclosure.

Referring to FIG. 4, when the number of PRs required for configuring the flexible accelerator is one and two, the concept of topology is not applied, and when the number of PRs is at least three, the concept of topology may be applied.

For example, when the number of PRs required for configuring the flexible accelerator is three, the three PRs are arranged in a straight line shape or arranged in the form of a bracket. When the number of PRs is four, various types of representative topologies are possible along with a straight line arrangement. When the number of PRs is five, various types of topologies are possible along with a straight line arrangement.

Although six or more PRs are not illustrated, it is not difficult to predict topologies of the six or more PRs by expanding the concept of the representative topology illustrated in FIG. 4.

Figure 5:
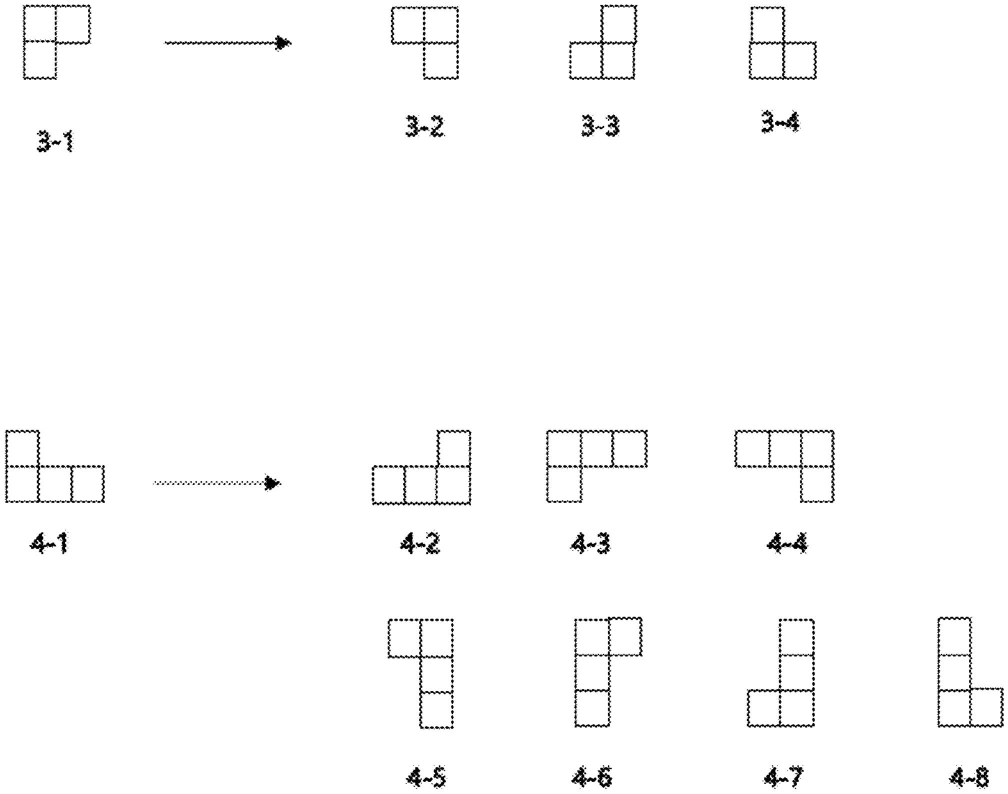
FIG. 5 illustrates an expansion of one representative topology.

FIG. 5 illustrates an expansion of one representative topology.

Referring to FIG. 5, a representative topology 3-1 in the form of a bracket including three PRs is rotated around a specific PR constituting the representative topology 3-1, or is rotated around a virtual vertical line connecting the upper part and the lower part of the drawing and a virtual horizontal line connecting the left side and the right side of the drawing by 180°, so that three expanded topologies 3-2 to 3-4 can be easily implemented.

A representative topology 4-1 in an 'L' shape including four PRs is also rotated around a specific PR constituting the representative topology 4-1, or is rotated around the virtual vertical line and the virtual horizontal line by 180°, so that seven expanded topologies 4-2 to 4-8 can be easily implemented.

When the method illustrated in FIG. 5 is applied, the representative topology of the plurality of PRs illustrated in FIG. 4 can be expanded in various ways and can also be applied even when the number of PRs is six or more. Therefore, description thereof is omitted.

As described above, when the number of PRs is determined, a plurality of representative topologies corresponding to the number of PRs can be implemented. The present disclosure proposes to set representative topologies according to the number of PRs in advance, to compare the representative topologies with a location where there are available PRs in the PR map 110, and to determine, as an optimal application place, a location where fragmentation of PRs in the PR map 110 can be minimized.

Figure 6:
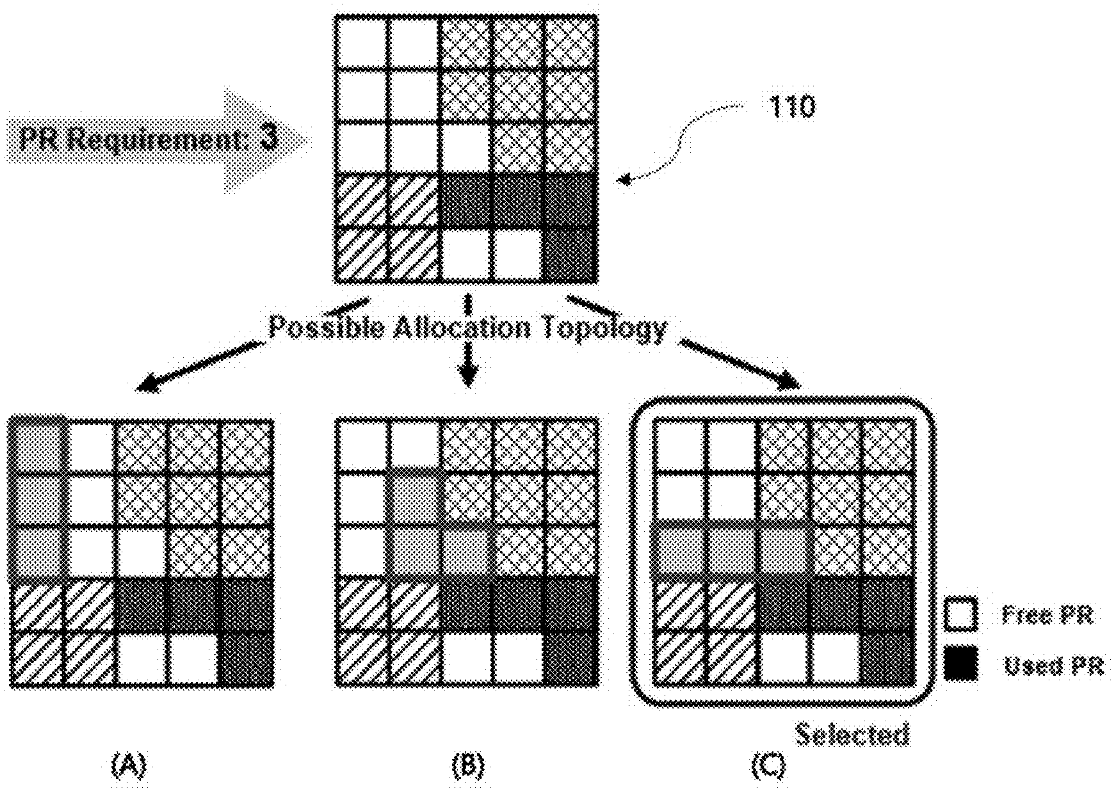
FIG. 6 illustrates an example of application to a PR map when three PRs are used.

FIG. 6 illustrates application examples of a PR map when three PRs are used. The PR map shown in FIG. 6 may correspond to the PR map 110 of FIG. 1.

Referring to FIG. 6, the PR map 110 includes 25 PRs, in which groups of eight PRs, four PRs, and four PRs are already in use, so nine PRs are available. The three PRs need to be allocated as one group in a state in which they are adjacent to one another, and they are selected from the nine PRs. However, among the nine PRs shown in FIG. 6, the three PRs are not applicable to two PRs adjacent to each other at a lower part of the PR map 110, and thus are applicable to only seven PRs adjacent to one another at an upper part of the PR map 110.

In FIG. 6, examples (A) and (C) each show a straight line type topology of the three PRs, and an example (B) shows a bracket type topology of the three PRs.

Referring to FIG. 6, since a PR region that can be used later after selecting the three PRs is in an 'L' shape in the examples (A) and (B) and a PR region that can be used later after selecting the three PRs is in a square shape in the example (C), up to 4 PRs can be used even after each of the three examples is implemented, so the possibility of fragmentation of the PR map 110 is not high in all the three examples (A), (B), and (C).

When limiting to the examples (A) to (C) of FIG. 6, the possibility of PR selection is diverse, but it is preferable to select the example (C).

Figure 7:
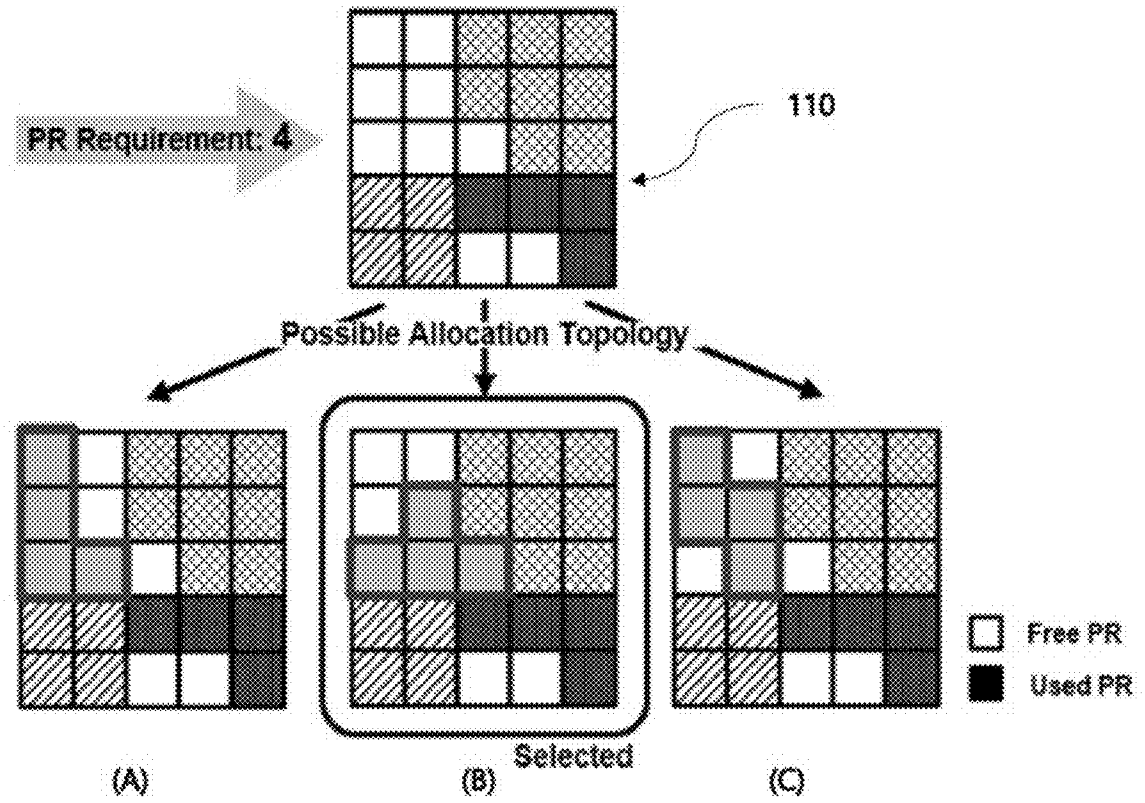
FIG. 7 illustrates an example of application to a PR map when four PRs are used.

FIG. 7 illustrates application examples of a PR map when four PRs are used. The PR map shown in FIG. 7 may correspond to the PR map 110 of FIG. 1.

Referring to FIG. 7, when the number of available PRs in the PR map 110 is 9, three representative topologies may be provided by using 4 PRs among the 9 PRs.

Referring to FIG. 7, the number of available PRs after selecting the four PRs is five in each of the three application examples. However, after the four PRs is selected, up to two PRs are available in an example (A), up to three PRs are available in an example (B), and only one PR is available in an example (C).

Accordingly, it is preferable to select the example (B) among the examples shown in FIG. 7.

As can be seen from the examples of FIGS. 6 and 7, with respect to which embodiment is preferable to select PRs required to configure an accelerator, the present disclosure proposes to assign a weight to each application example based on a shape of PRs that can be used later when a specific topology is selected to configure the accelerator, record weights assigned to application examples of all possible topologies, and select one of the application examples of the possible topologies based on the recorded weights, the selected application example corresponding to a maximum weight among the recorded weights.

From the point of view of fragmentation, all the three examples illustrated in FIG. 6 may be given the same weight or weights with no difference, but in the three examples of FIG. 7, the example (B) is given the highest weight and then the example (A) is given a higher weight than the example (C). The highly weighted example, e.g., the example (B), will have a low probability of fragmentation compared to the lowly weighted example, e.g., the example (A) or (C).

As in the examples illustrated in FIGS. 6 and 7, when required PRs are allocated to the PR map 110, the effect of the present disclosure can be sufficiently achieved by considering only fragmentation. However, as will be described below, the effect of the present disclosure can also be achieved by applying a method of selecting a topology that minimizes a PR reconfiguration time.

In order to understand the PR reconfiguration time, it is necessary to recognize an embodiment of the PR map 110 as described below.

Figure 8:
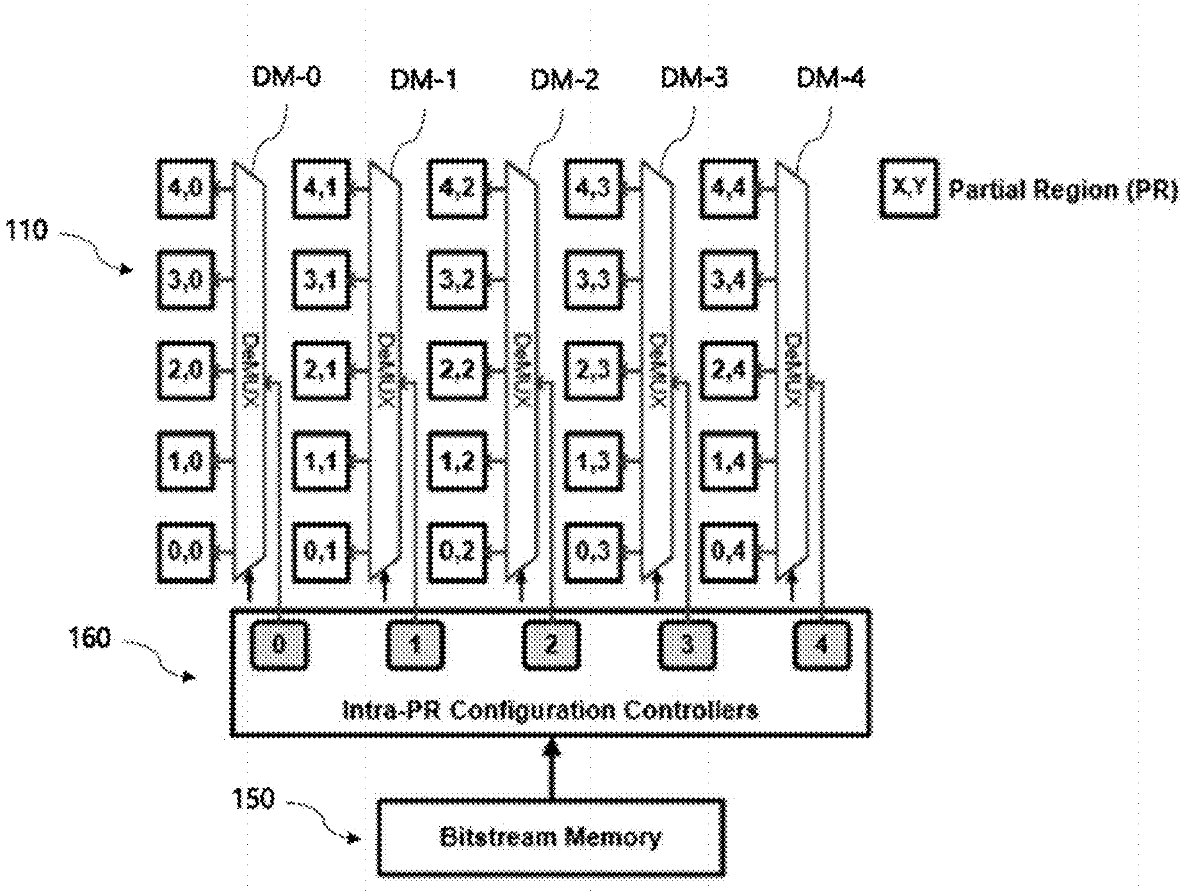
FIG. 8 illustrates a PR map, an intra PR configuration controller, and a memory in accordance with an embodiment of the present disclosure.

FIG. 8 illustrates a PR map, an intra-PR configuration controller, and a memory in accordance with an embodiment of the present disclosure. The PR map, the intra-PR configuration controller, and the memory illustrated in FIG. 8 may correspond to the PR map 110, the intra-PR configuration controller 160, and the bitstream memory 150 of FIG. 1, respectively.

Referring to FIG. 8, the PR map 110 includes a plurality of de-multiplexers DM-0 to DM-4 operating in response to control signals output from a plurality of intra-PR configuration controllers 0 to 4 constituting the intra-PR configuration controller 160.

Each of the de-multiplexers DM-0 to DM-4 is configured to select a PR arranged in a top-to-bottom direction in FIG. 8. Therefore, the first intra-PR configuration controller 0 may control reconfiguration of five PRs 4,0/3,0/2,0/1,0/0,0 connected to the first demultiplexer DM-0. That is, when the first intra-PR configuration controller 0 is activated, it is possible to sequentially reconfigure the five PRs 4,0/3,0/2, 0/1,0/0,0.

The second intra-PR configuration controller 1 may control reconfiguration of five PRs 4,1/3,1/2,1/1,1/0,1 connected to the second de-multiplexer DM-1. Similarly, when the second intra-PR configuration controller 1 is activated, it is possible to sequentially reconfigure the five PRs 4,1/3,1/ 2,1/1,1/0,1.

Since the third intra-PR configuration controller 2 to the fifth intra-PR configuration controller 4 can also be described using the same logic, detailed descriptions thereof are omitted.

Figure 9:
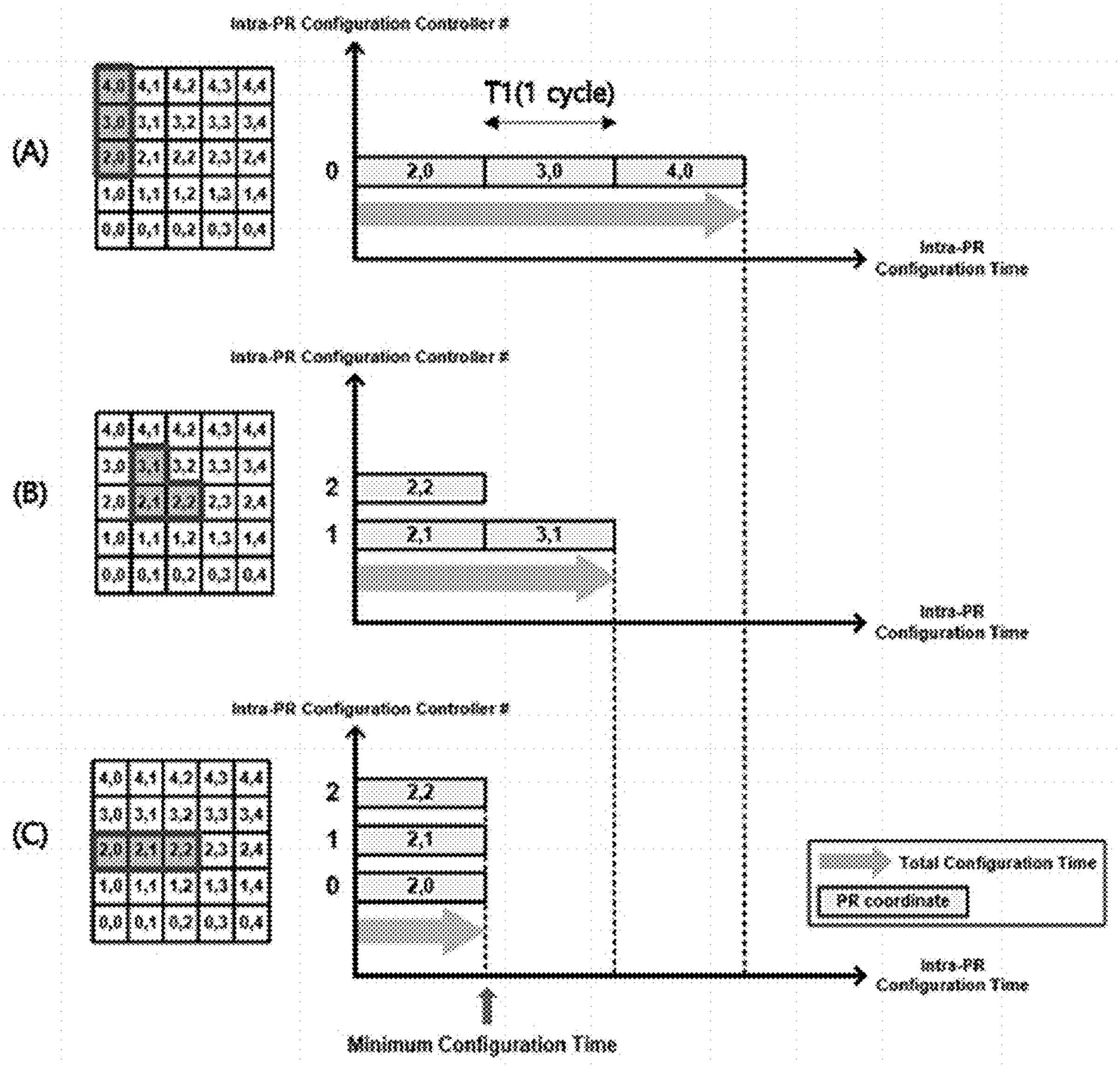
FIG. 9 illustrates comparing reconfiguration times or cycles of PRs by using a representative topology of three PRs.

FIG. 9 illustrates comparing PR reconfiguration times or cycles by using a representative topology of three PRs.

In FIG. 9, (A) shows an example of reconstructing three PRs 4,0/3,0/2,0 that are vertically arranged in a straight line type using one intra-PR configuration controller. Referring to FIG. 8, it can be expected that in this example, after one PR is reconfigured, subsequent PRs can be sequentially reconfigured. Assuming that a time required for reconfiguring one PR is T1 or 1 cycle, a reconfiguration time of three consecutive PRs may be 3T1 or 3 cycles.

In FIG. 9, (B) shows an example of reconstructing three PRs 3,1/2,1/2,2 in an 'L' shape. In this example, two PRs 2,1/3,1 arranged in the vertical direction need to be sequentially reconfigured, but two PRs 2,1/2,2 arranged in the horizontal direction may be simultaneously reconstructed. Referring to FIG. 8, PR(2,1) is reconfigured by the second intra-PR configuration controller 1, and PR(2,2) is reconstructed by the third-intra PR configuration controller 2. Since the second intra-PR configuration controller 1 and the third intra-PR configuration controller 2 can be activated at the same time, a reconfiguration time of 2T1 or 2 cycles is required when reconstructing the three PRs 3,1/2,1/2,2 in the 'L' shape.

In FIG. 9, (C) shows an example of reconstructing three PRs 2,0/2,1/2,2 arranged in the horizontal direction. This may be performed in a reconfiguration time of 1T1 or 1 cycle since the first intra-PR configuration controller 0 to the third intra-PR configuration controller 2 can be simultaneously activated.

Referring to the application examples illustrated in FIG. 9, when reconstructing three PRs, times or cycles required for reconstructing the three PRs are different depending on the topology formed by the three PRs. Among the topologies shown in FIG. 9, the topology in a straight line type in the horizontal direction takes the shortest reconfiguration time, and the topology in a straight line type in the vertical direction has the longest reconfiguration time.

When determining a topology of a plurality of PRs, considering the reconfiguration time of the PRs may increase a processing speed and a processing energy of the on-chip multi-core system.

Therefore, a topology capable of optimizing the use efficiency of the on-chip multi-core system can be selected by merging a topology with the shortest reconfiguration time and a topology that can minimize fragmentation.

As described above, in addition to maximizing the use efficiency of the on-chip multi-core system by optimizing a topology and an application location of PRs, the present disclosure also proposes the following method of minimizing the energy and time required for reconfiguration of a specific flexible accelerator by allowing PRs used in another flexible accelerator to be utilized for the specific flexible accelerator instead of returning the PRs to a PR map.

Figure 10:
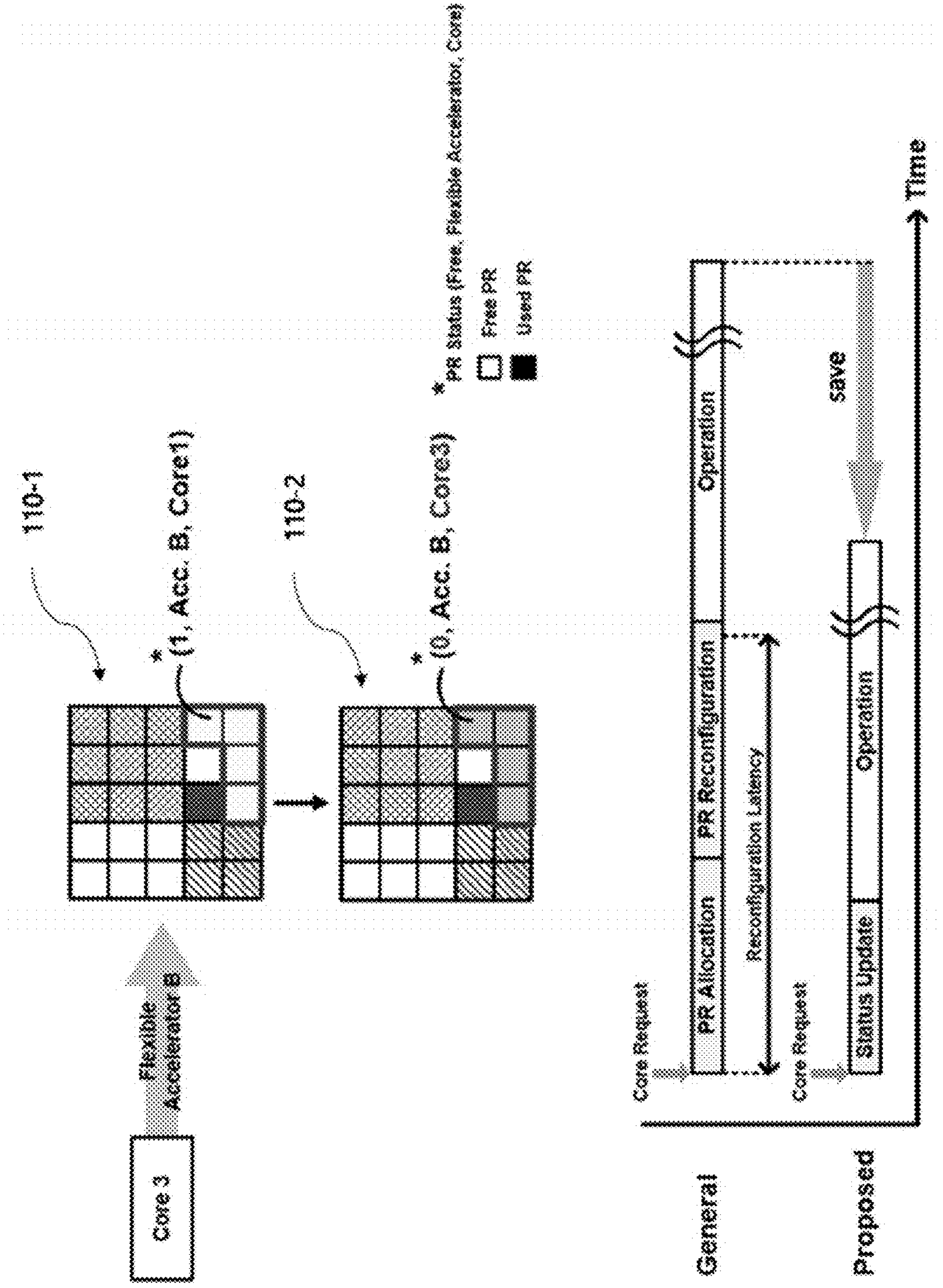
FIG. 10 illustrates an example of reutilizing a flexible accelerator with temporary locality.

FIG. 10 illustrates an example of reutilizing a flexible accelerator with temporary locality.

Referring to FIG. 10, when nine PRs, four PRs, and one PR among 25 PRs included in a PR map 110 are used and a first core Core 1 owns a flexible accelerator B using four PRs, it is assumed that a third core Core 3 has requested the use of the flexible accelerator B.

When a state of a PR used and applied to a core is indicated by (whether the PR is used, target flexible accelerator, the core owning the PR), a state of a PR owned by the first core Core 1 may be indicated by (1, Acc. B, Core 1) as illustrated in an upper PR map 110-1 of FIG. 10. In the state of the PR, i.e., in (1, Acc. B, Core 1), 1 indicates that the PR is in use, Acc. B represents the flexible accelerator B, and Core 1 means that the PR is owned by the first core Core 1.

A state of a PR to be used by the third core Core 3 may be indicated by (0, Acc. B, Core 3) as illustrated in a lower PR map 110-2 of FIG. 10, where 0 indicates that the PR is not in use, i.e., 0 indicates that the PR is a free PR. That is, it means that when the first core Core 1 finishes using the flexible accelerator B, the third core Core 3 will use the PR.

In general, used PRs are returned to the PR map 110 and are allocated to a new flexible accelerator. However, in the present disclosure, a PR allocated to a flexible accelerator with temporal locality is not returned to the PR resource management processor 130 that manages the PR map 110, and only the ownership information of the PR is changed so that the flexible accelerator can be reused by another core. As a result, it is possible to reduce or save the time and energy required for configuring a flexible accelerator to be used by the other core.

In accordance with embodiments, information of the flexible accelerator with temporary locality is stored in a nonvolatile memory (NVM) and utilized, so that the information can be preserved regardless of an on-off state of a power source of a system. Thus, a total running time of the system can be shortened.

Referring to FIG. 10, compared to a case where a used flexible accelerator is not reused (General), it can be seen that a method (Proposed) proposed by the present disclosure can reduce the reconfiguration time by the degree indicated by an arrow (save).

That is, in the general case, since the used flexible accelerator is not reused, a reconfiguration latency including a PR allocation time and a PR reconfiguration time is required to configure a flexible accelerator to be used by, e.g., the third core Core 3, in response to a core request. On the other hand, in the proposed case, since the used flexible accelerator can be reused by updating a status of the used flexible accelerator as shown in the lower PR map 110-2, a status update time, which is shorter than the reconfiguration latency, is only required to re-assign the used flexible accelerator to the third core Core 3 in response to the core request. Therefore, the total running time of the system can be significantly reduced.

In accordance with another embodiment, depending on the degree of utilization of a flexible accelerator, a PR used in a flexible accelerator frequently connected to another flexible accelerator is allocated to be adjacent to a PR used in the other flexible accelerator, and on the other hand, a PR used in a flexible accelerator not frequently connected to another flexible accelerator is allocated to be at a corner of the PR map 110.

In addition to the above embodiments, the present disclosure also proposes an embodiment in which each core exclusively owns a specific flexible accelerator and an embodiment in which a plurality of cores share a specific flexible accelerator.

Figure 11:
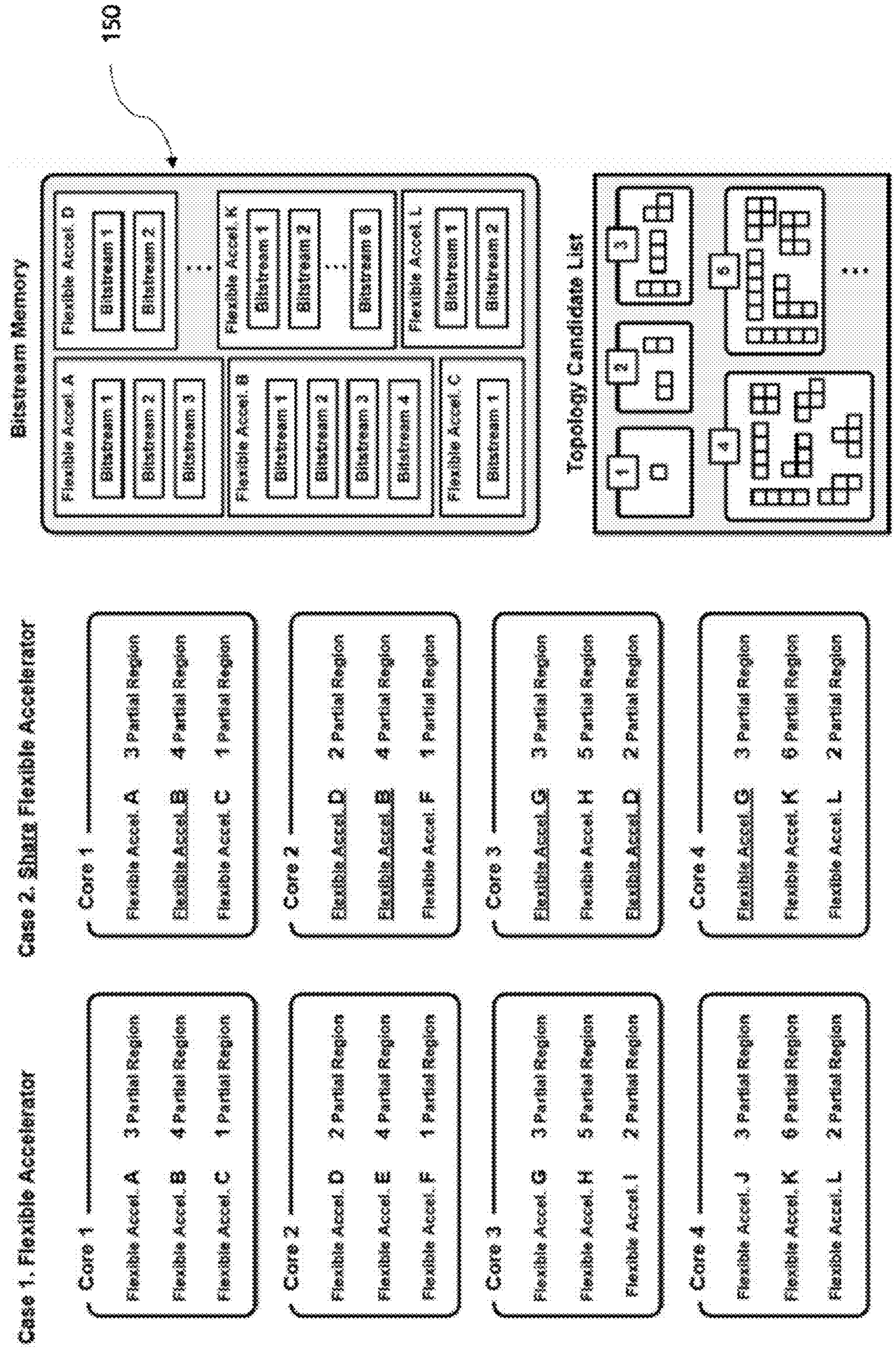
FIG. 11 illustrates an example of using a flexible accelerator.

FIG. 11 illustrates an example of using a flexible accelerator.

Referring to FIG. 11, a bitstream memory 150 includes a flexible accelerator A using three PRs, a flexible accelerator B using four PRs, a flexible accelerator C using one PR, a flexible accelerator D using two PRs, a flexible accelerator K using six PRs, and a flexible accelerator L using two PRs according to three bitstreams.

Available topologies depending on the number of PRs are stored in a topology candidate list. In another embodiment, the available topologies are stored in the form of a table according to the number of PRs.

FIG. 11 shows two different cases, e.g., g a first case Case 1 and a second case Case 2. In the first case Case 1, each core exclusively uses a flexible accelerator. In the second case Case 2, a plurality of cores share a specific flexible accelerator.

In the first case Case 1, a first core Core 1 to a fourth core Core 4 exclusively use three flexible accelerators A to C, D to F, G to I, and J to L, respectively. Since each of the flexible accelerators A to L is exclusively used by one core, the flexible accelerator is not used by another core.

The second case Case 2 is identical to the first case Case 1 in that the first core Core 1 to the fourth core Core 4 each use three flexible accelerators. However, in the second case Case 2, the flexible accelerator B is shared by the first core Core 1 and the second core Core 2, the flexible accelerator D is shared by the second core Core 2 and the third core Core 3, and the flexible accelerator G is shared by the third core Core 3 and the fourth core Core 4.

Figure 12:
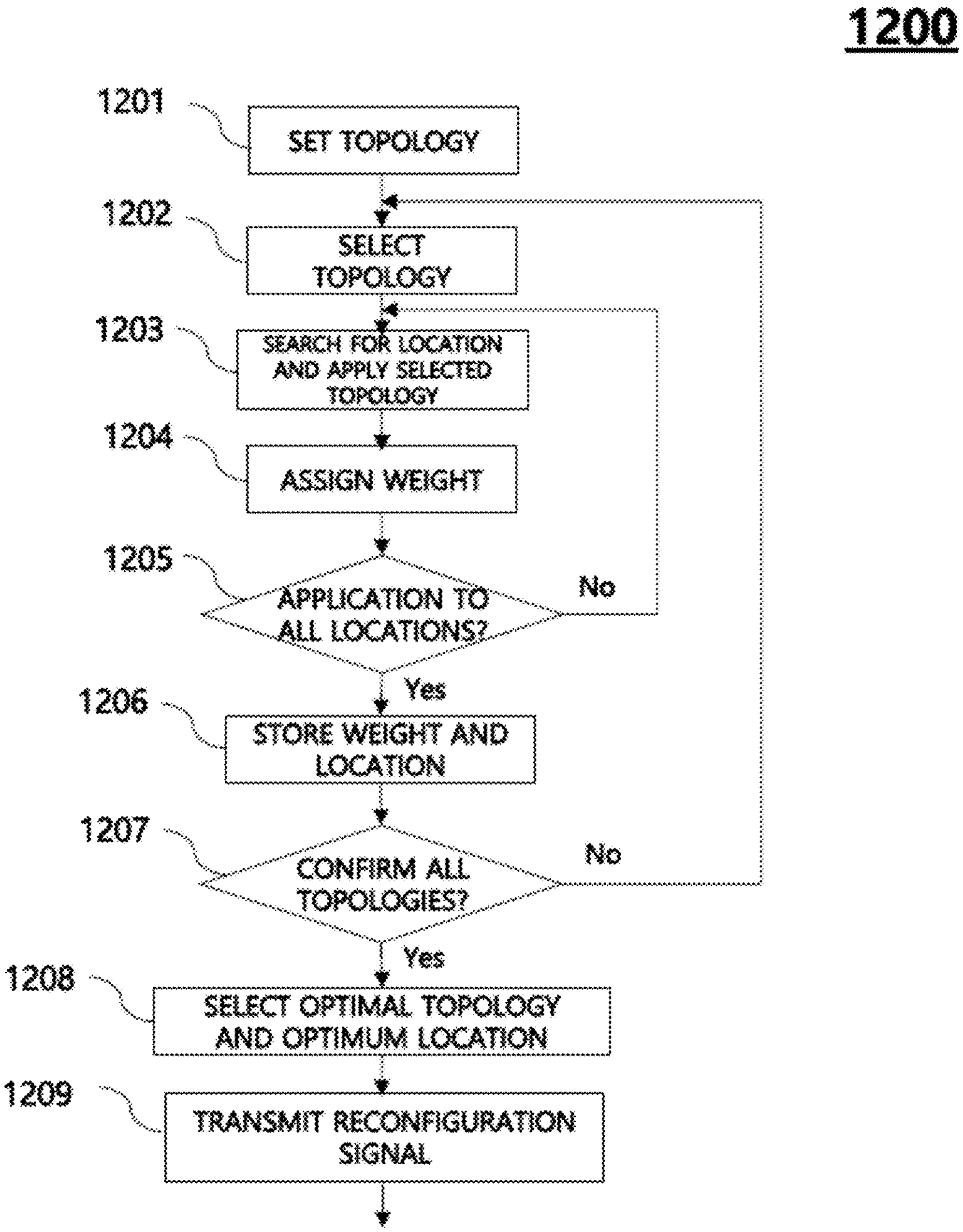
FIG. 12 illustrates an optimizing method for PR resource selection in accordance with an embodiment of the present disclosure.

FIG. 12 is an optimizing method 1200 for PR resource selection in accordance with an embodiment of the present disclosure.

Referring to FIG. 12, the optimizing method 1200 includes step 1201 of setting a plurality of topologies of PRs according to the number of PRs, steps 1202 to 1207 of applying each of the plurality of topologies corresponding to the number of PRs required to configure a flexible accelerator requested by a core to all applicable PR regions among available PR regions of a PR map and assigning a weight to each application by considering an available PR region of the PR map that remains after the application, and step 1208 of selecting, as an optimal topology and an optimum location for configuring the flexible accelerator, a topology and an application location corresponding to an application having a maximum weight.

After the step 1208 is performed, the optimizing method 1200 may further include step 1209 of transmitting a reconfiguration signal for reconfiguring PRs in the PR map, thereby configuring the flexible accelerator.

The steps 1202 to 1207 include the step 1202 of selecting one of the plurality of topologies corresponding to the number of PRs required to configure the flexible accelerator requested by the core, the steps 1203 and 1205 of searching for available PR locations in the PR map where the selected topology can be applied and applying the selected topology to each of the searched available PR locations, the step 1204 of assigning a weight to each application by considering available PRs in the PR map that remain after applying the selected topology, the step 1206 of storing the assigned weights and corresponding PR locations, and the step 1207 of confirming whether the step 1202, the steps 1203 and 1205, the step 1204, and the step 1206 are performed on all topologies set according to the number of PRs, so that the step 1202, the steps 1203 and 1205, the step 1204, and the step 1206 are repeated until all topologies are processed by the step 1202, the steps 1203 and 1205, and the step 1204.

The weight is preferably set to have a larger value when fragmentation of the remaining available PRs in the PR map 110 after applying the selected topology is smaller.

Figure 13:
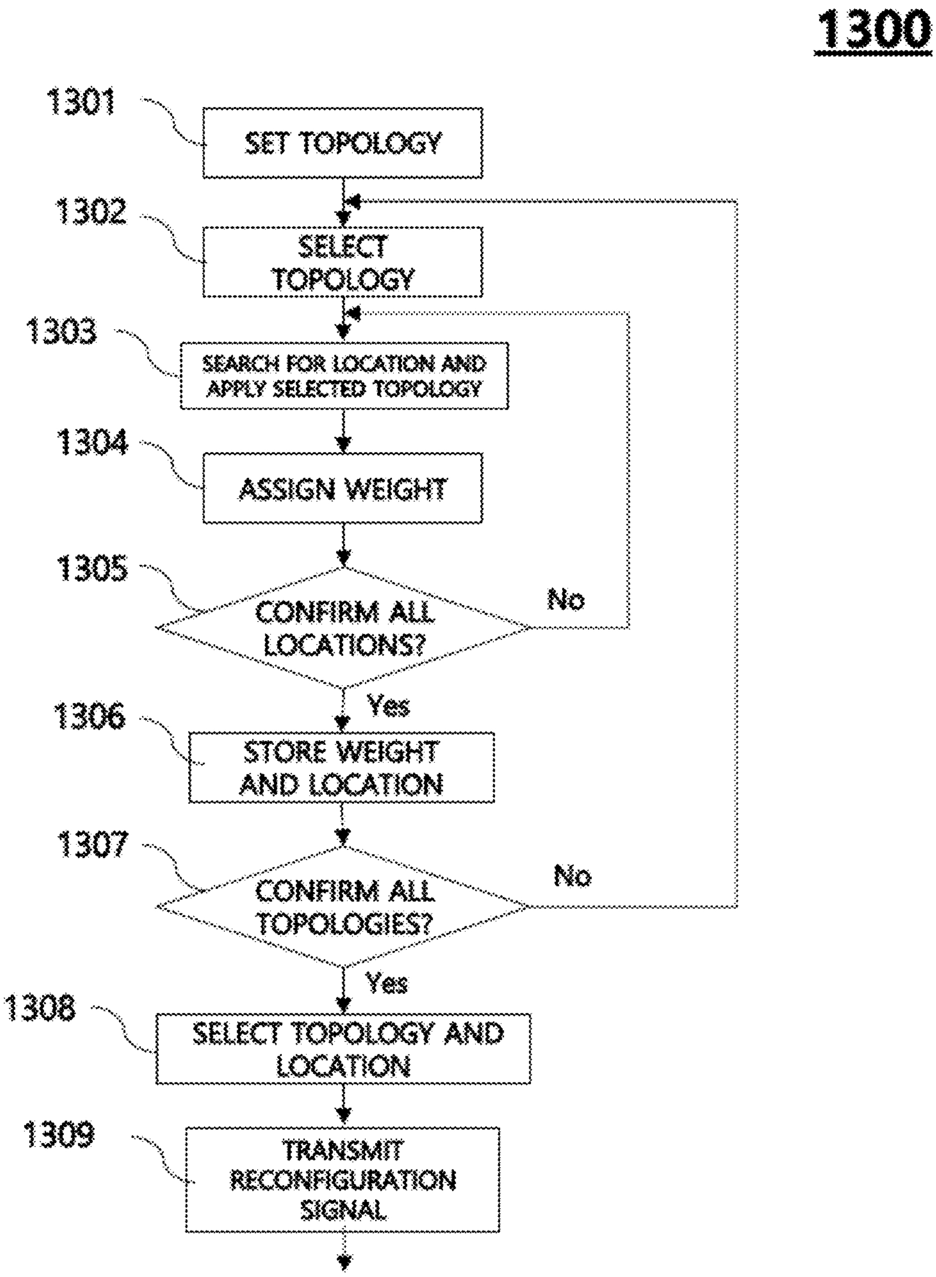
FIG. 13 illustrates an optimizing method for PR resource selection in accordance with another embodiment of the present disclosure.

FIG. 13 is an optimizing method 1300 for PR resource selection in accordance with another embodiment of the present disclosure.

Referring to FIG. 13, the optimizing method 1300 includes step 1301 of setting a plurality of topologies of PRs according to the number of PRs, steps 1302 to 1307 of applying a topology where a required time (or cycle) for PR configuration increases from a topology where the required time (or cycle) is minimum, among a plurality of topologies corresponding to the number of PRs required to configure a flexible accelerator requested by a core, to all applicable PR regions among available PR regions of a PR map and assigning a weight to each application by considering an available PR region of the PR map that remains after the application, and step 1308 of selecting, as an optimal topology and an optimum location for configuring the flexible accelerator, a topology and an application location corresponding to an application having a maximum weight.

After the step 1308 is performed, the optimizing method 1300 may further include step 1309 of transmitting a reconfiguration signal for reconfiguring PRs in the PR map, thereby configuring the flexible accelerator.

The steps 1302 to 1307 include the step 1302 of selecting one of the plurality of topologies corresponding to the number of PRs required to configure the flexible accelerator requested by the core, the steps 1303 and 1305 of searching for available PR locations in the PR map where the selected topology can be applied and applying the selected topology to each of the searched available PR locations, the step 1304 of assigning a weight to each application by considering available PRs in the PR map that remain after applying the selected topology, the step 1306 of storing the assigned weights and corresponding PR locations, and the step 1307 of confirming whether the step 1302, the steps 1303 and 1305, the step 1304, and the step 1306 are performed on all topologies set according to the number of PRs, so that the step 1302, the steps 1303 and 1305, the step 1304, and the step 1306 are repeated until all topologies are processed by the step 1302, the steps 1303 and 1305, the step 1304, and step 1306.

The weight is preferably set to have a larger value when the reconfiguration time of the flexible accelerator is shorter and the fragmentation of the PR map is smaller.

The present disclosure described above can be implemented as computer readable codes on a medium on which a program is recorded. A computer readable medium includes all types of recording devices in which data that can be read by a computer system is stored. Examples of the computer readable medium include a hard disk drive (HDD), a solid state disk (SSD), a silicon disk drive (SDD), a ROM, a RAM, a CD-ROM, a magnetic tape, a floppy disk, and an optical data storage device.

Although the technical spirit of the present disclosure has been described together with the accompanying drawings, this is an illustrative example of a preferred embodiment of the present disclosure, but does not limit the present disclosure. In addition, it is clear that various modifications and imitations can be made by anyone skilled in the art to which the present disclosure belongs without departing from the scope of the technical spirit of the present disclosure.

What is claimed is:

1. An on chip multi-core system comprising:

a PR (partial region) map including a plurality of PRs that are implemented with an eFPGA (embedded field programmable gate array);

a core unit including a plurality of cores;

a PR resource management processor configured to determine a number of PRs required to configure a flexible accelerator requested by a core of the plurality of cores, to select a topology of the determined number of PRs satisfying at least one of a minimum fragmentation condition of the PR map and a minimum reconfiguration time, to generate a routing signal for allocating the selected topology of the determined number of PRs to the core, and to generate a PR reconfiguration signal for reconfiguring the selected topology of the determined number of PRs;

an inter-PR routing controller configured to connect the selected topology of the determined number of PRs to the core in response to the routing signal;

a bitstream memory configured to store a bitstream including configuration information of the selected topology of the determined number of PRs; and an intra-PR configuration controller configured to configure the selected topology of the determined number of PRs according to the bitstream in response to the PR reconfiguration signal.

2. The on chip multi-core system of claim 1, wherein each of the PRs comprises:

a plurality of logic blocks configured to constitute a circuit corresponding to the configuration information of the PRs; and a plurality of switching blocks configured to switch the plurality of logic blocks according to the configuration information of the PRs.

3. The on chip multi-core system of claim 1, wherein the PR resource management processor determines the number of PRs required to configure the flexible accelerator requested by the core by referring to a table in which a number of PRs required for each flexible accelerator is determined in advance.

4. The on chip multi-core system of claim 1, wherein the PR resource management processor compares at least one available topology previously determined corresponding to the determined number of PRs with available PRs in the PR map, and selects the PRs in an optimal location in the PR map.

5. The on chip multi-core system of claim 4, wherein the PR resource management processor compares the at least one available topology with the available PRs in the PR map, assigns a weight to each group of PRs corresponding to the available topology among the available PRs by considering fragmentation of available PRs remaining after excluding the group of PRs from the PR map, and selects the PRs in the optimal location based on weights assigned to groups of PRs corresponding to the at least one available topology.

6. The on chip multi-core system of claim 4, wherein the at least one available topology is set when the determined number of PRs is three or more.

7. The on chip multi-core system of claim 1, wherein, when a flexible accelerator requiring at least three PRs is requested, the PR resource management processor selects at least three PRs for which a sum of configuration times of the at least three PRs when configuring the flexible accelerator is minimized.

8. The on chip multi-core system of claim 1, wherein, in a case where a specific flexible accelerator has temporary locality, when a specific core that owns the specific flexible accelerator finishes using the specific flexible accelerator, ownership of the specific flexible accelerator is transferred to another core requesting the specific flexible accelerator.

9. The on chip multi-core system of claim 1, wherein the PR resource management processor assigns a specific flexible accelerator to be shared by two or more of the plurality of cores or to be exclusively used by one of the plurality of cores.

* * * * *